(12) United States Patent  (10) Patent No.: US 6,532,628 B2
Kim  (45) Date of Patent: Mar. 18, 2003

(54) HINGE ASSEMBLY FOR LCD MONITOR

(75) Inventor: Kyoung Bok Kim, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/897,506

(22) Filed: Jul. 3, 2001

(65) Prior Publication Data

US 2002/0002759 A1 Jan. 10, 2002

(30) Foreign Application Priority Data

Jul. 8, 2000 (KR) .......................... 2000-39121

(51) Int. Cl.[7] .......................... E05C 17/64; E05D 11/08; H05K 7/16
(52) U.S. Cl. .............................. 16/342; 16/337; 16/374; 248/917; 248/919; 248/920; 248/923; 361/682
(58) Field of Search .......................... 16/337, 340, 342, 16/371, 374; 248/917, 919, 920, 921, 922, 923; 361/681, 682, 683

(56) References Cited

U.S. PATENT DOCUMENTS

| 5,022,778 | A | * | 6/1991 | Lu | 16/273 |
| 5,109,571 | A | * | 5/1992 | Ohshima et al. | 16/284 |
| 5,197,704 | A | * | 3/1993 | Kitamura | 16/305 |
| 5,467,504 | A | * | 11/1995 | Yang | 16/342 |
| 5,473,794 | A | * | 12/1995 | Kobayashi | 16/319 |
| 5,906,010 | A | * | 5/1999 | Suzuki | 16/342 |
| 6,038,739 | A | * | 3/2000 | Katoh | 16/329 |
| 6,145,797 | A | * | 11/2000 | Uehara | 16/342 |
| 6,154,925 | A | * | 12/2000 | Miura | 16/338 |
| 6,231,021 | B1 | * | 5/2001 | Hong | 248/371 |
| 6,347,433 | B1 | * | 2/2002 | Novin et al. | 16/342 |

* cited by examiner

Primary Examiner—Gary S. Hartmann
(74) Attorney, Agent, or Firm—Jacobson Holman PLLC

(57) ABSTRACT

A hinge assembly including a horizontal shaft, and a monitor rotator having one part fixed to the shaft for rotating as one unit with the shaft, and the other part fixed to a rear part of the monitor. Supporting member rotators are rotatably coupled to opposite sides of the shaft, with a supporting member fixed to the supporting member rotators for supporting the monitor at a rear part thereof from the floor at an angle to the monitor. Elastic members are provided to the shaft such that one end thereof is held at the monitor rotator fixed to the monitor, and the other end thereof is held at the supporting member rotators fixed to the supporting member, for providing an appropriate torque between the monitor and the supporting member according to an angle between the monitor and the floor, thereby adjusting a tilting angle of the LCD monitor.

20 Claims, 4 Drawing Sheets

HINGE ASSEMBLY FOR LCD MONITOR

BACKGROUND OF THE INVENTION

1. Field of the Invention

The present invention relates to LCD (Liquid Crystal Display) monitors, and more particularly, to a hinge assembly fitted to move in association with an LCD monitor supporting member for adjusting a tilting angle of an LCD monitor.

2. Background of the Related Art

Referring to FIG. 1, the LCD monitor 1 is rotatably mounted on the hinge assembly 3 fitted on a supporting member 2 provided for supporting the LCD monitor with respect to a floor. The supporting member 2 has a stand width larger than a width of the LCD monitor 1 for safe supporting of the LCD monitor for a tilt of the monitor.

The hinge assembly 3, adjusting a tilting angle of the LCD monitor 1, is provided with central brackets 5 fixed to the supporting member 2, rotating brackets 4 for coupling the LCD monitor 1 at opposite ends, a shaft (not shown) for coupling the fixed brackets 5 and the rotating brackets 4, friction brackets 7 on the shaft in contact with the rotating brackets 4, and springs 6 on the shaft for pressing the rotating bracket 4 to the friction bracket 7 for causing friction.

The monitor is coupled to the supporting member 2 through the foregoing hinge assembly 3, such that only the LCD monitor 1 is rotated while the supporting member 2 is fixed.

However, since the friction is made to be caused by surface to surface contact of components of the hinge assembly, the LCD monitor supporting structure with the hinge assembly requires the user much force in moving the LCD monitor such that a fine tuning of a tilting angle of the LCD monitor is not convenient. Moreover, it is required to hold the supporting member when it is intended to move the LCD monitor for prevention of movement of the supporting member together with the LCD monitor.

Furthermore, the supporting member can not but have size and weight larger and heavier in proportion to size and weight of the LCD monitor because the supporting member is required to sustain the LCD monitor at a tilted poise or rotation, that reduces utilization of a space the LCD monitor is located, as much.

SUMMARY OF THE INVENTION

Accordingly, the present invention is directed to a hinge assembly that substantially obviates one or more of the problems due to limitations and disadvantages of the related art.

An object of the present invention is to provide a hinge assembly movable between the LCD monitor and the supporting member, for easily adjusting a tilting angle of the LCD monitor without exerting an excessive force.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the hinge assembly includes a horizontal shaft, a monitor rotator having one part fixed to the shaft for rotating as one unit with the shaft, and the other part fixed to a rear part of the monitor, supporting member rotators rotatably coupled to opposite sides of the shaft, a supporting member fixed to the supporting member rotators for supporting the monitor at a rear part thereof from a floor at an angle to the monitor, and elastic members provided to the shaft such that one end thereof is held at the monitor rotator fixed to the monitor, and the other end thereof is held at the supporting member rotators fixed to the supporting member, for providing an appropriate torque between the monitor and the supporting member according to an angle between the monitor and the floor, thereby making an easy adjustment of a tilting angle of the LCD monitor standing on a floor as the hinge assembly couples the LCD monitor and the supporting member.

The elastic members are a plurality of torsion springs coupled on opposite sides of the shaft.

The monitor rotator includes a horizontal part having fastening holes for screw fastening to a rear part of the monitor, a fastening part extended from a central part of the horizontal part toward the shaft having screw holes for screw fastening with a central part of the shaft, and holding holes adjacent to corners between the horizontal part and the fastening part for holding ends of the elastic members.

Each of the supporting member rotators includes a vertical leaf having fastening holes for screw fastening to the supporting member, and a coupling leaf of a disk form formed as a unit with the vertical leaf having a central hole for inserting to the shaft.

The coupling leaf of the supporting member rotator includes a limiting slot formed as a portion of an outer circumference of the disk is cut away dispose a part of the supporting member rotator therein, for limiting a rotation angle of the supporting member rotator by a length of the limiting slot.

The shaft includes screw holes in a central part for fastening the monitor rotator thereto, and guide walls at opposite sides of the central part for alignment with the monitor rotator, for being pressed by the elastic members to cause friction when the shaft rotates.

The hinge assembly further includes friction washers inserted in opposite ends of the shaft in contact with the supporting member rotators, and nuts on outer sides of the friction washers for pressing the friction washer against the supporting member rotators.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
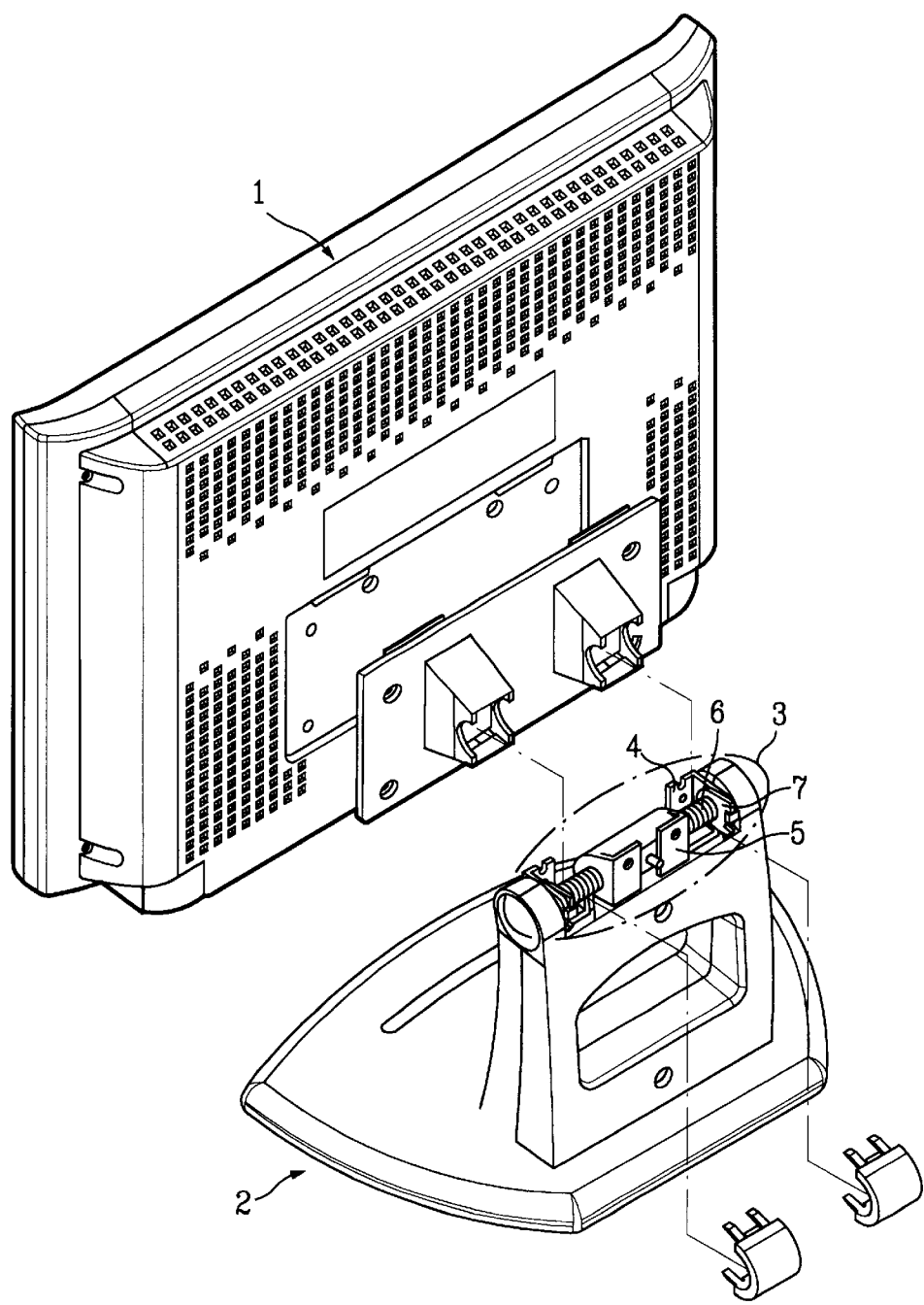
FIG. 1 illustrates a perspective view of an LCD monitor coupled to a supporting member by a related art hinge assembly.
Figure 2:
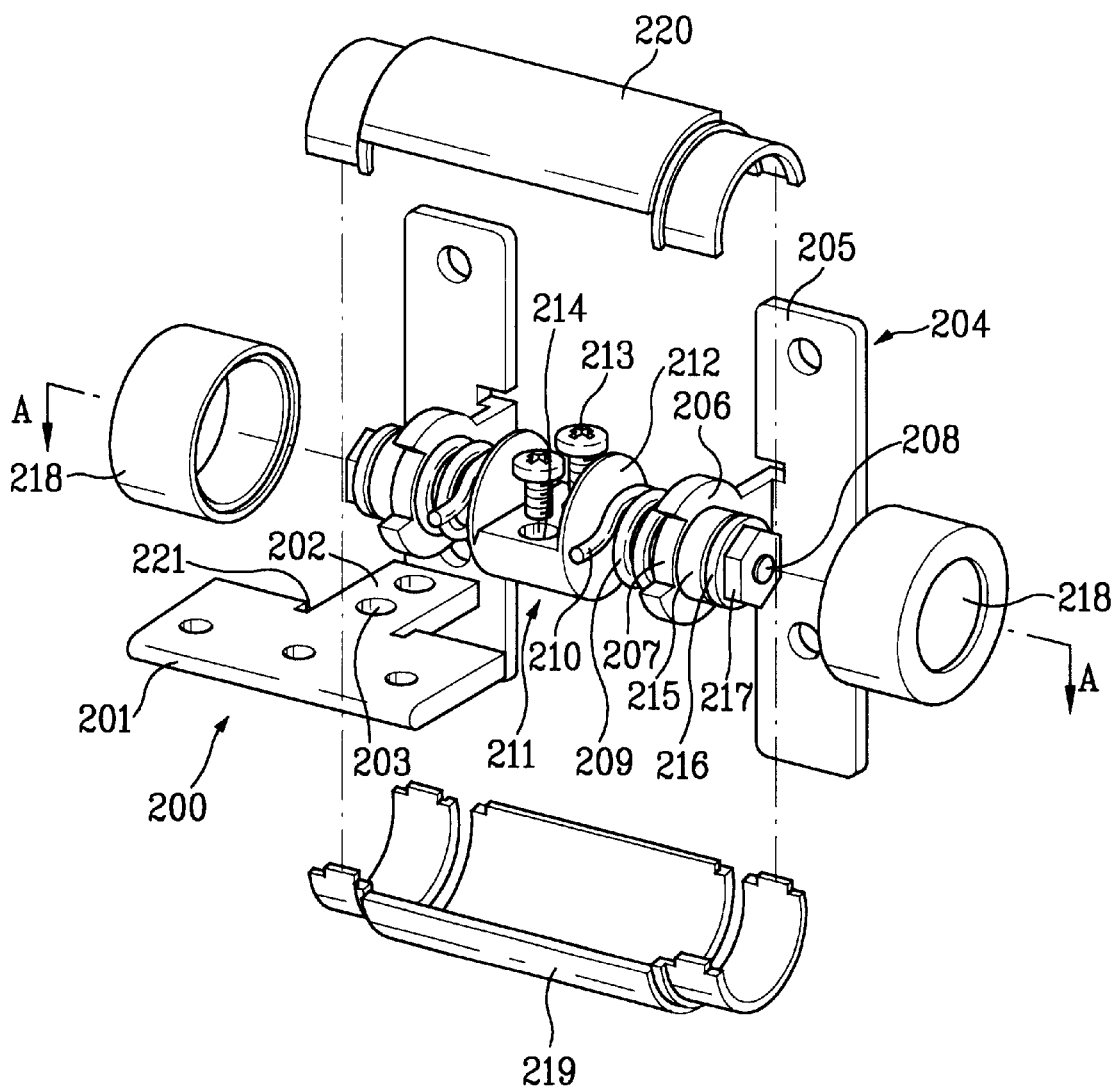
FIG. 2 illustrates a perspective view of a hinge assembly in accordance with a preferred embodiment of the present invention.

Reference will now be made in detail to the preferred embodiments of the present invention, examples of which are illustrated in the accompanying drawings. FIG. 2 illustrates a perspective view of a hinge assembly in accordance with a preferred embodiment of the present invention.

Referring to FIG. 2, the hinge assembly in accordance with a preferred embodiment of the present invention includes a monitor rotator 200 having a monitor (not shown) coupled thereto, a shaft 208 having a fixing part 211 at a central part thereof for fixing the monitor rotator 200 thereto, supporting member rotators 204 coupled to the supporting member (not shown) which supports the monitor, for rotating centered on the shaft 208, and torsion springs 209 fitted between the monitor rotator 200 and the supporting member rotators 204 for making the monitor rotator 200 to move with the supporting member rotators 204. There are friction washers 215, sliding washers 216, and nuts 217 coupled to opposite ends of the shaft 208 on outer sides of the supporting member rotators 204 in succession for compressing the supporting member rotators from outside thereof. In addition to this, there are covers 219, 220, and 218 for protecting the foregoing components. The monitor herein denotes the LCD monitor. The aforementioned structure will be explained, in more detail.

The shaft 208 has a central lower part having a diameter greater than other parts to project around the shaft to form the fixing part 211 of a semi-cylindrical form. The fixing part 211 has screw holes 214 in a flat top surface thereof for fixing, and supporting the monitor rotator 200 from below. The fixing part 211 has semi-circular guide walls at both sides thereof for partitioning a part having the screw holes 214 to fix the monitor rotator 200 thereto from other parts. The guide walls 212 guides exact alignment of the monitor rotator 200 fixed to the fixing part 211 of the shaft 208, and are compressed by the torsion springs 209 between the supporting member rotators 204 on opposite sides of the shaft 208 for causing friction when the shaft 208 is rotated.

The monitor rotator 200, rotatably coupled with the monitor to rotate on the shaft, has a 'T' form on the whole. The monitor rotator 200 includes a horizontal part 201 parallel to the shaft 208 having fastening holes for positive fastening of the monitor, and a fastening part 202 on a central outer side of the horizontal part 201 projected toward the shaft 208 having screw holes 203 matched to the screw holes 214 in the fixing part 211, for fixing the monitor rotator 200 to the shaft 208 with screws 213 through the holes 203 and the screw holes 214 in the fixing part 211. There are slots 221 in corners between the fastening part 202 and the horizontal part 201 of the monitor rotator 200 for inserting the guide walls 212 on the shaft 208 in the slots 221 when the monitor rotator 200 is coupled to the shaft 208. There are torsion spring 209 holding holes (not shown) adjacent to the slots 221 for inserting ends 210 of the torsion springs 209 formed by bending an end of the torsion spring 209, partly.

In the meantime, each of the supporting member rotators 204 is in the form of a bracket, coupled to the supporting member 31 which sits on a floor, and supports the monitor at a back side thereof. The supporting member rotator includes a vertical leaf 205 having fastening holes for fastening the supporting member thereto, and a coupling leaf 206 bent at a right angle from a side of the vertical leaf 205 for rotatable coupling to the shaft 208. The coupling leaf 206 has the form of a disk with a central hole of sufficient size to insert the shaft 208 therein.

Figure 3:
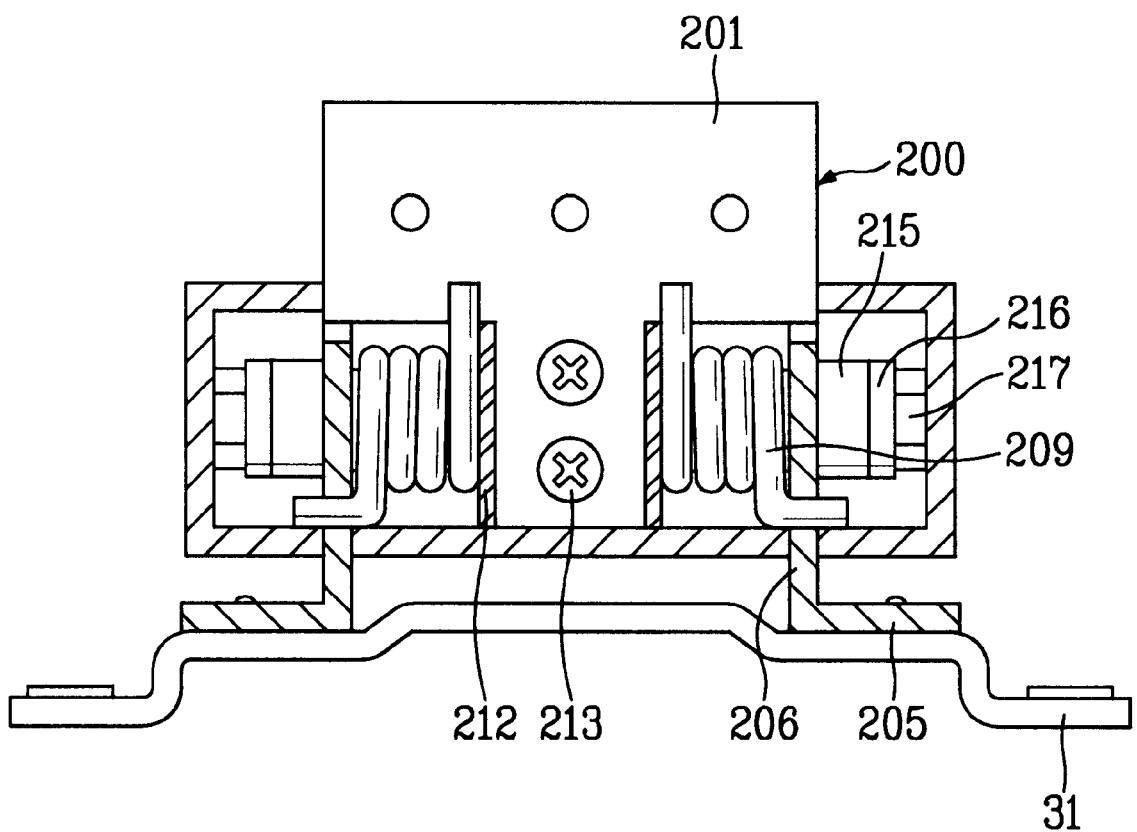
FIG. 3 illustrates a section across 'A—A' in the hinge assembly in FIG. 2.

Referring to FIG. 3, each of the torsion springs, having one end held in a holding hole in the monitor rotator 200, has the other end also held on the coupling leaf 206 of the supporting member rotator 204 at the rear of the shaft 208. Consequently, an elastic force of the torsion spring 209 is exerted onto the supporting member rotator 204 such that, when the monitor coupled with the monitor rotator 200 is pulled forward to stand up, the supporting member coupled to the supporting member rotator 204 is also stood up, accordingly.

The coupling leaf 206 of a disk form has an elongated limiting slot 207 formed as a portion of outer circumference of the disk is cut away along the central hole. Accordingly, when the supporting member rotator 204 is coupled to the shaft 208, and the monitor rotator 200 is fixed to the fixing part 211 of the shaft 208, a side of the horizontal part 201 of the monitor rotator 200 is positioned in the limiting slot 207, so that the supporting member rotator 204 rotates in the limiting slot 207 until the monitor rotator 200 is caught at an end of the limiting slot 207, when the supporting member rotator 204 stops, to prevent the monitor from rotating excessively, and to adjust an argle of view of the user to the monitor to the most appropriate range.

In the meantime, there are the torsion springs 209 inserted at opposite sides of guide walls 212 of the shaft 208, the supporting member rotators 204 coupled thereto thereafter, and friction washers 215 and sliding washers 216 fitted thereto in succession in contact with surfaces of the coupling leaves 206 of the supporting member rotators 204, and nuts 217 fastened on threads on opposite ends of the shaft 208. The friction between the supporting member rotators 204 and the shaft 208 varies with the extent of tightness of the fastening of the nuts 217, which sustains a tilting angle the user of the monitor desires.

In addition to this, there are upper and lower covers 219, and 220 enclosing the shaft 208 to protect components of the foregoing embodiment, and cylindrical caps 218 each with one closed side coupled to the opposite ends of the shaft 208 for protecting the nuts 217.

The work of the foregoing hinge assembly in accordance with the preferred embodiment of the present invention will be explained in a state the hinge assembly is applied to an LCD monitor 30, with reference to FIG. 4.

Figure 4:
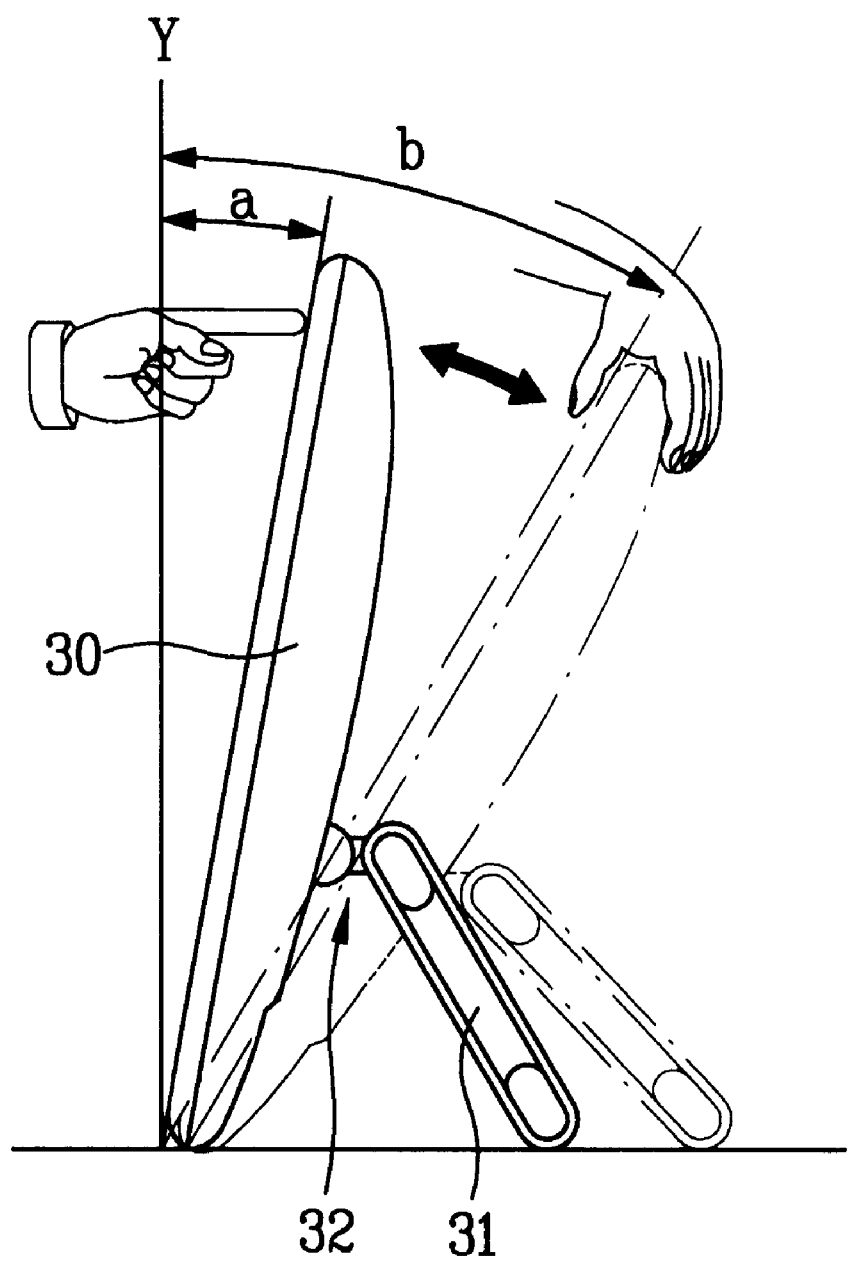
FIG. 4 illustrates operation of the hinge assembly of the present invention.

Referring to FIG. 4, the LCD monitor 30, coupled with the supporting member 31 through the hinge assembly 32 of the embodiment of the present invention, stands on a floor. A material having a friction coefficient greater than the supporting member 31 is employed as a material of a portion of the LCD monitor 30 in contact with the floor, for causing the supporting member 31 with a smaller friction coefficient to slide and tilt the LCD monitor 30 when the user pushes the LCD monitor 30.

Initially, the hinge assembly 32 supports the LCD monitor 30 to stand at a tilting angle 'a' to a Y-axis vertical to the ground for preventing the LCD monitor 30 from falling down in forward direction by its own weight. The tilting angle 'a' is a minimum angle at which a stable standing of the LCD monitor is permitted. That is, referring to FIG. 3, since the monitor rotator 200 is stopped at one end of the limiting slot 207, impeding any further rotation of the supporting member rotators 204, in a case the supporting member rotators 204 are rotated in a clockwise direction, the LCD monitor 30 stands at the angle 'a', initially.

When the user pushes the LCD monitor 30 to change a tilting angle of the LCD monitor 30 within a range of titling angle 'a' and 'b', the supporting member rotators 204 are also rotated in a counter clockwise direction, tilting the supporting member 31, too. Upon removal of the force on the LCD monitor 30, the LCD monitor 30 stands still as a weight of the LCD monitor 30 and the friction in the hinge assembly 32 are balanced.

Under above case too, the LCD monitor 30 is tilted no more than the tilting angle 'b' as the other end of the limiting slot 207 stops the monitor rotator 200 again when the supporting member rotators 204 are rotated in the counter clockwise direction. The tilting angle 'b' is the greatest tilting angle in a range of appropriate tilting angle of the LCD monitor at which the user can watch an image on the LCD monitor 30.

When the user pulls the LCD monitor 30 forward again, the supporting member rotators 204 are rotated as much as the LCD monitor 30 is pulled forward by elastic forces of the torsion springs 209 biased between the monitor rotator 200 and the supporting member rotators 204, to cause the supporting member to stand too, thereby always maintaining a state the LCD monitor 30 is supported on the floor, automatically.

As has been explained, the hinge assembly of the present invention permits to simplify a structure for supporting the LCD monitor and provide convenience to the user, thereby improving production cost and efficiency of the LCD monitor and satisfaction of the users.

Different from the related art hinge assembly which maintains a tilting angle of the LCD monitor only by a friction torque of the related art hinge assembly itself, the hinge assembly of the present invention which distributes a supporting force between the LCD monitor and the supporting member, to be operative only with a small friction torque, permits the user to adjust the tilting angle of the LCD monitor only with one hand without exerting an excessive force, that in turn prolongs a lifetime of the hinge assembly.

It will be apparent to those skilled in the art that various modifications and variations can be made in the hinge assembly of the present invention without departing from the spirit or scope of the invention. Thus, it is intended that the present invention cover the modifications and variations of this invention provided they come within the scope of the appended claims and their equivalents.

What is claimed is:

1. A hinge assembly for adjusting an inclination of a monitor, comprising:
    a horizontal shaft;
    a monitor rotator having one part fixed to the shaft for rotating as one unit with the shaft, and the other part fixed to a rear part of the monitor;
    supporting member rotators rotatably coupled to opposite sides of the shaft;
    a supporting member having an upper end and a lower end, said upper end fixed to the supporting member rotators for supporting the monitor at a rear part thereof from a floor at an angle to the monitor, said upper end of said supporting member rotating on said shaft and said lower end sliding on said floor to change said angle and thereby adjust the inclination of the monitor; and
    elastic members provided to the shaft such that one end thereof is held at the monitor rotator fixed to the monitor, and the other end thereof is held at the supporting member rotators fixed to the supporting member, for providing torque between the monitor and the supporting member according to said angle between the monitor and the floor.

2. The hinge assembly as claimed in claim 1, wherein the elastic members are a plurality of torsion springs coupled on opposite sides of the shaft.

3. The hinge assembly as claimed in claim 1, wherein the monitor rotator includes:
    a horizontal part having fastening holes for screw fastening to a rear part of the monitor;
    a fastening part extended from a central part of the horizontal part toward the shaft having screw holes for screw fastening with a central part of the shaft; and
    ends of said elastic members being held adjacent to corners between the horizontal part and the fastening part.

4. The hinge assembly as claimed in claim 1, wherein each of the supporting member rotators includes:
    a vertical leaf having fastening holes for screw fastening to the supporting member; and
    a coupling leaf having a disk-shaped portion formed as a unit with the vertical leaf and having a central hole for insertion of the shaft.

5. The hinge assembly as claimed in claim 4, wherein the coupling leaf of the supporting member rotator includes:
    a limiting slot formed as a portion of an outer circumference of the disk which is cut away to dispose a part of the monitor rotator therein, for limiting a rotation angle of the supporting member rotator by a length of the limiting slot.

6. The hinge assembly as claimed in claim 1, wherein the shaft includes;
    screw holes in a central part for fastening the monitor rotator thereto; and
    guide walls at opposite sides of the central part for alignment with the monitor rotator, for being pressed by the elastic members to cause friction when the shaft rotates.

7. The hinge assembly as claimed in claim 1, further comprising:
    friction washers inserted in opposite ends of the shaft in contact with the supporting member rotators; and
    nuts on outer sides of the friction washers for pressing the friction washers against the supporting member rotators.

8. The hinge assembly as claimed in claim 1, wherein the lower end of said supporting member includes a material having a friction coefficient that allows said lower end to slide on said floor in response to force applied to adjust the inclination of the monitor.

9. A monitor with a hinge assembly for adjusting an inclination of the monitor, said hinge assembly comprising:
    a horizontal shaft;
    a monitor rotator having one part fixed to the shaft for rotating as one unit with the shaft, and the other part fixed to a rear part of the monitor;
    supporting member rotators rotatably coupled to opposite sides of the shaft;
    a supporting member having an upper end and a lower end, said upper end fixed to the supporting member rotators for supporting the monitor at a rear part thereof from a floor at an angle to the monitor, said upper end of said supporting member rotating on said shaft and said lower end sliding on said floor to change said angle and thereby adjust the inclination of the monitor;

elastic members provided on the shaft such that one end thereof is held at the monitor rotator fixed to the monitor, and the other end thereof is held at the supporting member rotators fixed to the supporting member, for providing torque between the monitor and the supporting member according lo said angle between the monitor and the floor;

a lower edge of said monitor contacting the floor and having a coefficient of friction greater than that of said lower end of said supporting member.

10. The monitor and hinge assembly as claimed in claim 9, wherein the elastic members are a plurality of torsion springs coupled on opposite sides of the shaft.

11. The monitor and hinge assembly as claimed in claim 9, wherein the monitor rotator includes:

a horizontal part having fastening holes for screw fastening to a rear part of the monitor;

a fastening part extended from a central part of the horizontal part toward the shaft having screw holes for screw fastening with a central part of the shaft; and ends of said elastic members being held adjacent to corners between the horizontal part and the fastening part.

12. The monitor and hinge assembly as claimed in claim 9, wherein each of the supporting member rotators includes:

a vertical leaf having fastening holes for screw fastening to the supporting member; and a coupling leaf having a disk-shaped portion formed as a unit with the vertical leaf and having a central hole for insertion of the shaft.

13. The monitor and hinge assembly as claimed in claim 12, wherein the coupling leaf of the supporting member rotator includes:

a limiting slot formed as a portion of an outer circumference of the disk which is cut away to dispose a part of the monitor rotator therein, for limiting a rotation angle of the supporting member rotator by a length of the limiting slot.

14. The hinge assembly as claimed in claim 9, wherein the shaft includes;

screw holes in a central part for fastening the monitor rotator thereto; and guide walls at opposite sides of the central part for alignment with the monitor rotator, for being pressed by the elastic members to cause friction when the shaft rotates.

15. The monitor and hinge assembly as claimed in claim 9, further comprising:

friction washers inserted in opposite ends of the shaft in contact with the supporting member rotators; and nuts on outer sides of the friction washers for pressing the friction washers against the supporting member rotators.

16. The monitor and hinge assembly as claimed in claim 9, wherein said shaft is connected to the rear part of the monitor at a height that allows the inclination of the monitor to be adjusted by pushing or pulling on an upper edge portion of said monitor.

17. The monitor and hinge assembly as claimed in claim 16, wherein pushing against said upper edge portion tilts said monitor to a less vertical orientation, said lower edge portion held against the floor by the coefficient of friction thereof while said lower end of said supporting member slides backward relative to a viewing screen of said monitor.

18. The monitor and hinge assembly as claimed in claim 17, wherein each of the supporting member rotators includes:

a vertical leaf having fastening holes for screw fastening to the supporting member; and a coupling leaf having a disk-shaped portion formed as a unit with the vertical leaf and having a central hole for insertion of the shaft, said coupling leaf including a limiting slot formed as a portion of an outer circumference of the disk-shaped portion which is cut away to dispose a part of the monitor rotator therein, for limiting a rotation angle of the supporting member rotator and the resulting less vertical orientation by a length of the limiting slot.

19. The monitor and hinge assembly as claimed in claim 16, wherein pulling said upper edge portion tilts said monitor to a more vertical orientation, said lower edge portion held against the floor by the coefficient of friction thereof while said lower end of said supporting member slides forward relative to a viewing screen of said monitor.

20. The monitor and hinge assembly as claimed in claim 19, wherein each of the supporting members rotates includes:

a vertical leaf having fastening holes for screw fastening to the supporting member; and a coupling leaf having a disk-shaped portion formed as a unit with the vertical leaf and having a central hole for insertion of the shaft, said coupling leaf including a limiting slot formed as a portion of an outer circumference of the disk-shaped portion which is cut away to disposed a part of the monitor rotator therein, for limiting a rotation angle of the supporting member rotator and the resulting more vertical orientation by a length of the limiting slot.

* * * * *